(12) United States Patent
Phillips et al.

(10) Patent No.: US 9,894,104 B2
(45) Date of Patent: *Feb. 13, 2018

(54) SYSTEMS AND METHODS FOR PROVIDING CONTEXT TO SIP MESSAGES

(71) Applicant: GENBAND US LLC, Frisco, TX (US)

(72) Inventors: Paul Phillips, Westboro, MA (US); Ian Macfarlane, Stittsville (CA); Sumit Garg, Frisco, TX (US)

(73) Assignee: GENBAND US LLC, Plano, TX (US)

( * ) Notice: Subject to any disclaimer, the term of this patent is extended or adjusted under 35 U.S.C. 154(b) by 381 days.

This patent is subject to a terminal disclaimer.

(21) Appl. No.: 14/087,280

(22) Filed: Nov. 22, 2013

(65) Prior Publication Data

US 2015/0149647 A1    May 28, 2015

(51) Int. Cl.
  *G06F 15/16* (2006.01)
  *H04L 29/06* (2006.01)
(52) U.S. Cl.
  CPC ................ *H04L 65/1006* (2013.01)
(58) Field of Classification Search
  None
  See application file for complete search history.

(56) References Cited

U.S. PATENT DOCUMENTS

| | | | | |
|---|---|---|---|---|
| 2007/0174538 A1* | 7/2007 | Christoffersson | ..... | H04L 67/141 711/100 |
| 2007/0276907 A1* | 11/2007 | Maes | ................ | H04M 7/0075 709/204 |
| 2008/0031258 A1* | 2/2008 | Acharya | ................ | H04L 47/10 370/395.42 |
| 2010/0157980 A1* | 6/2010 | Ellsworth | ......... | H04M 3/42365 370/352 |
| 2010/0246570 A1* | 9/2010 | Chavez | ............... | H04L 65/1006 370/352 |
| 2011/0103373 A1* | 5/2011 | Shatsky | ............. | H04L 65/1016 370/352 |
| 2014/0006632 A1* | 1/2014 | Evens | .................. | H04L 65/605 709/227 |
| 2014/0032773 A1* | 1/2014 | Peter | .................... | H04L 67/142 709/228 |

* cited by examiner

*Primary Examiner* — Brian Whipple
*Assistant Examiner* — Tesfu Mekonen
(74) *Attorney, Agent, or Firm* — Haynes and Boone, LLP

(57) ABSTRACT

Systems, methods, and computer program products are provided for providing context through a scripting-type programming language to data included in a SIP message. The method includes defining one or more contexts through a scripting-type computer programming language. The one or more contexts reference a particular pre-defined portion of a SIP message and are provided by the scripting-type computer programming language. A series of SIP messages may then be received, where each SIP message in the series belongs to the same SIP message flow. After a particular SIP message in the series is received, the message is parsed to identify whether it includes any portion of data that can be referenced via one or more contexts. Any particular portion of data that can be referenced via a context is associated with a respective context such that the respective portion of data can be referenced by the context.

18 Claims, 11 Drawing Sheets

SYSTEMS AND METHODS FOR PROVIDING CONTEXT TO SIP MESSAGES

RELATED APPLICATIONS

This application is related to U.S. patent application Ser. No. 14/087,253, entitled "Systems and Methods for Customizing SIP Message Processing" filed herewith, and U.S. patent application Ser. No. 14/087,311, entitled "Systems and Methods for Processing SIP Message Flows" filed herewith. Each of these applications is incorporated by reference in its entirety.

TECHNICAL FIELD

The present description relates, in general, to a computer scripting language for creating manipulations for a session border controller (SBC).

BACKGROUND

The Session Initiation Protocol is a signaling communications protocol used in voice and video call over IP networks. Messages formatted according the SIP specification are exchanged between two endpoints such as IP telephones. SIP messages may also be exchanged with a translation server that allows communication between an IP network and a switched telephone network. SIP messages are included in a flow of messages that carry data that describe the message and include data for initiation and maintaining the voice or video call.

Systems exist that process SIP messages as part of a process to deliver SIP messages to an endpoint device. Such processing may be carried out by a session border controller (SBC) or other similar device that carries out PBX functionality for a group of IP enabled communication devices. Many currently available SBC modify SIP messages before they are delivered to their destinations but do not offer configuration abilities where an end-user can change the SBC's behavior. What is needed is a method for configuring SBC and other internet appliances that handle SIP messages such as, for example, a scripting language.

BRIEF DESCRIPTION OF THE DRAWINGS

The present disclosure is best understood from the following detailed description when read with the accompanying figures.

SUMMARY

Figure 1A:
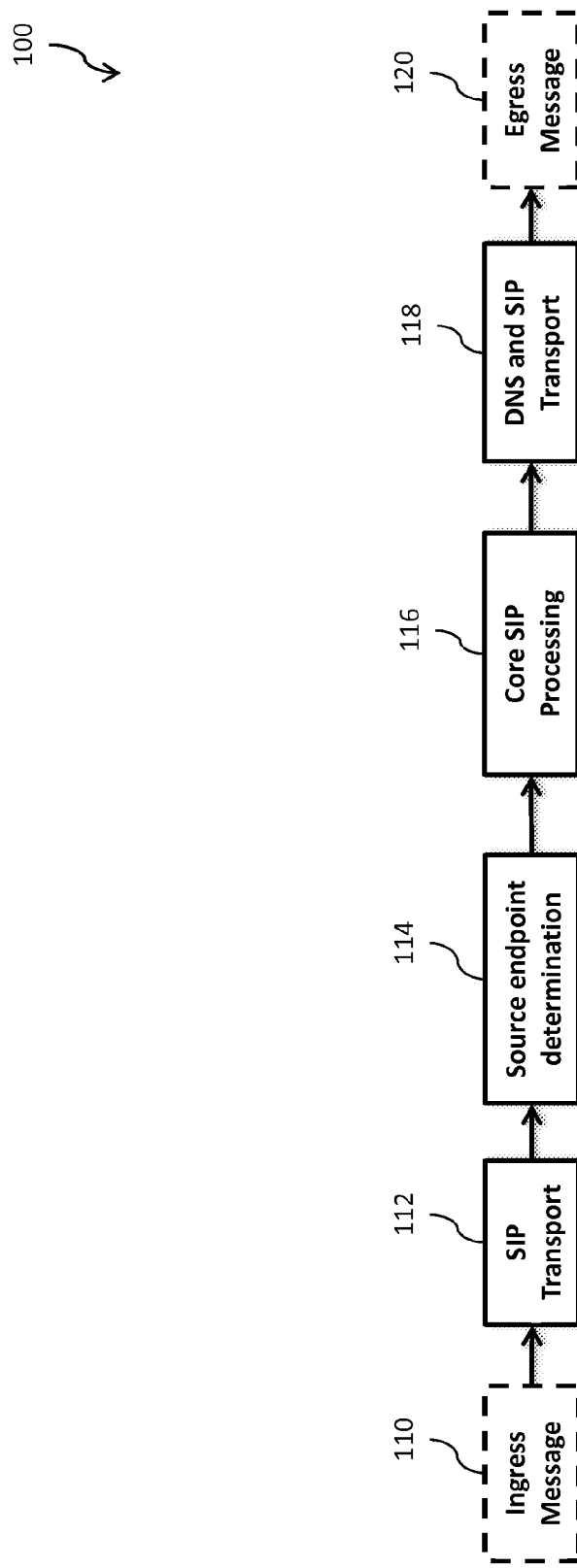
FIG. 1A illustrates an example of a SBC for which the embodiments described herein may be carried out.

According to one embodiment, a computer-implemented method is disclosed for configuring a computing system that processes messages according to the Session Initiation Protocol (SIP). The method includes defining, by a scripting-type computer processing language, one or more variables, where each variable is configured to store state data based on at least a portion of a SIP message and is associated with the SIP message flow. Once configuration is complete, a series of SIP messages belonging to the SIP message flow is received by the computer system. As each SIP message in the series is received, each SIP message is processed where the message processing includes modifying the state data stored in at least one of the variables based on data included in the respective SIP message.

According to another embodiment, a computer-implemented method is disclosed for providing context through a scripting-type programming language to data included in a SIP message. The method includes defining one or more contexts through a scripting-type computer programming language. The one or more contexts reference a particular pre-defined portion of a SIP message and are provided by the scripting-type computer programming language. A series of SIP messages may then be received, where each SIP message in the series belongs to the same SIP message flow. After a particular SIP message in the series is received, the message is parsed to identify whether it includes any portion of data that can be referenced via one or more contexts. Any particular portion of data that can be referenced via a context is associated with a respective context such that the respective portion of data can be referenced by the context.

According to another embodiment, a computer-implemented method is disclosed for modifying a Session Initiation Protocol (SIP) message included in a series of SIP messages associated with a SIP message flow. The method includes providing a scripting-type computer programming language. The scripting language includes contexts that reference pre-defined portions of data of a SIP message and variables for storing data associated with a particular SIP message flow. An interface for configuring one or more rules to be executed when processing one or more SIP messages in the message flow is provided. Each rule includes an action that describes a modification to be made to a particular SIP message. A particular SIP message included in the series of SIP messages is received. The particular SIP message is the parsed to determine at least a context of a portion of the message. The parsing including associating the portion of the message with a particular context. It is then determines whether criterion associated with each rule applies to at least the data associated with one of the contexts. When a particular context meets the criterion associated with a particular rule, the particular SIP message is modified based on the one or more actions associated with the particular rule.

According to another embodiment, a system and a computer program are disclosed. The computer program product includes a computer readable medium tangibly recording computer program logic for carrying out the method described above.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments include systems, methods, and computer program products for processing SIP messages associated with a SIP message flow via custom rules developed through a scripting-type programming language included in, for example, and SBC controller. The embodiments according to the present disclosure can be used in packet networks to establish communication sessions such as voice and video calls between endpoint devices. The SIP message processing is performed in addition to processing currently included in SIP processing systems that initiate, connect, and maintain a voice over IP call.

One concept disclosed herein includes a scripting-type computer programming language implemented in a SIP message processing controller that can be used to configure rules for modifying SIP messages. The rules are included in a profile that is associated with a processing stage of the SBC where the rules are applied. The rules include actions that are applied to SIP messages during the associated processing scope. The actions may include, for example, inserting data, deleting data, or modifying existing data of a SIP message. The rules may also include triggers that determine whether a given action is applied.

Another concept disclosed herein includes using the scripting-type computer programming language to define one or more variables. The variables can be associated with a particular rule profile, SBC processing scope, SIP message flow or SIP message. As will be described in more detail below, processing scope identifies a particular stage or level for processing the SIP message flow by an SBC. Variables associated with a particular SBC processing scope may only be accessible by rules associated with that scope. Variables associated with a particular rule profile may only be accessible by rules in that profile. Variables associated with a SIP message flow or a particular SIP message may only be accessible by the SIP message flow or SIP message, respectively. In this way, variables maintain a scope that controls the point in processing SIP messages where the variable may be utilized.

The variables may also include a uniquely identifiable name. Variables may be used to store data included in a SIP message or other data such as, for example, counters, generic string data, or binary flags. Since the variables can be associated with a SIP message flow or a processing scope, it is possible to store data from each successive SIP message in a message flow which consequently provides a state for each message flow.

Another concept disclosed herein includes defining one or more contexts that are associated with portions of data included in a SIP message. Contexts can be predefined unique identifiers that included in the scripting-type computer programming language that provide direct access or references to associated portions of SIP message. Contexts may be used in conjunction with variables in scripted rules so that an end user developer can construct rules that access and store particular portions of a SIP message. Contexts provide an improvement over existing systems in that a developer no longer needs to construct complex expressions to identify a specific portion of a SIP message.

In one example, SIP messages associated with a SIP message flow are received by an SBC. The SBC includes rules scripted by an end user using the scripting-type computer programming language that are applied to the SIP messages as the messages are processed in various stages of the SBC. When a SIP message enters a particular stage or scope, an associated a rule is applied to the SIP message by (1) determining whether the SIP message meets a trigger condition included in the rule and (2) applying an action associated with the trigger when the condition is met. The actions may include, for example, storing SIP message elements referenced by a context in a variable, copying data in a variable to an element in the SIP message, or removing the portion of the SIP message referenced by a context.

Overview of SBC Processing

FIG. 1A illustrates an example of an SBC 100 for which the embodiments described herein may be carried out. More specifically, FIG. 1A shows the various core processes that are conventionally implemented by an SBC. SBC 100 includes a number of stages for processing SIP messages received by the SBC over a computer network. The SIP messages received by SBC 100 may originate from any number of endpoints or servers connected to the SBC over the computer network. The SIP message processing stages in SBC 100 include, for example, SIP transport 112, source endpoint determination 114, core SIP processing 116, and DNS and SIP transport 118. When a SIP message such as, for example, ingress message 110 is received by SBC 100, it first enters processing stage 112 that determines the SIP transport protocol. Next, an endpoint is determined (stage 114) so ingress message 110 can be processed and sent to the correct endpoint. Core SIP processing (stage 116) is then performed and an egress message such as, for example, egress message 120 is prepared to be transmitted out of the system to another endpoint over the computer network. DNS and SIP transport protocols are determined (stage 118) for the egress message 120 and the egress message 120 is sent to and SBC that corresponds to the endpoint that will received the egress message 120.

Figure 1B:
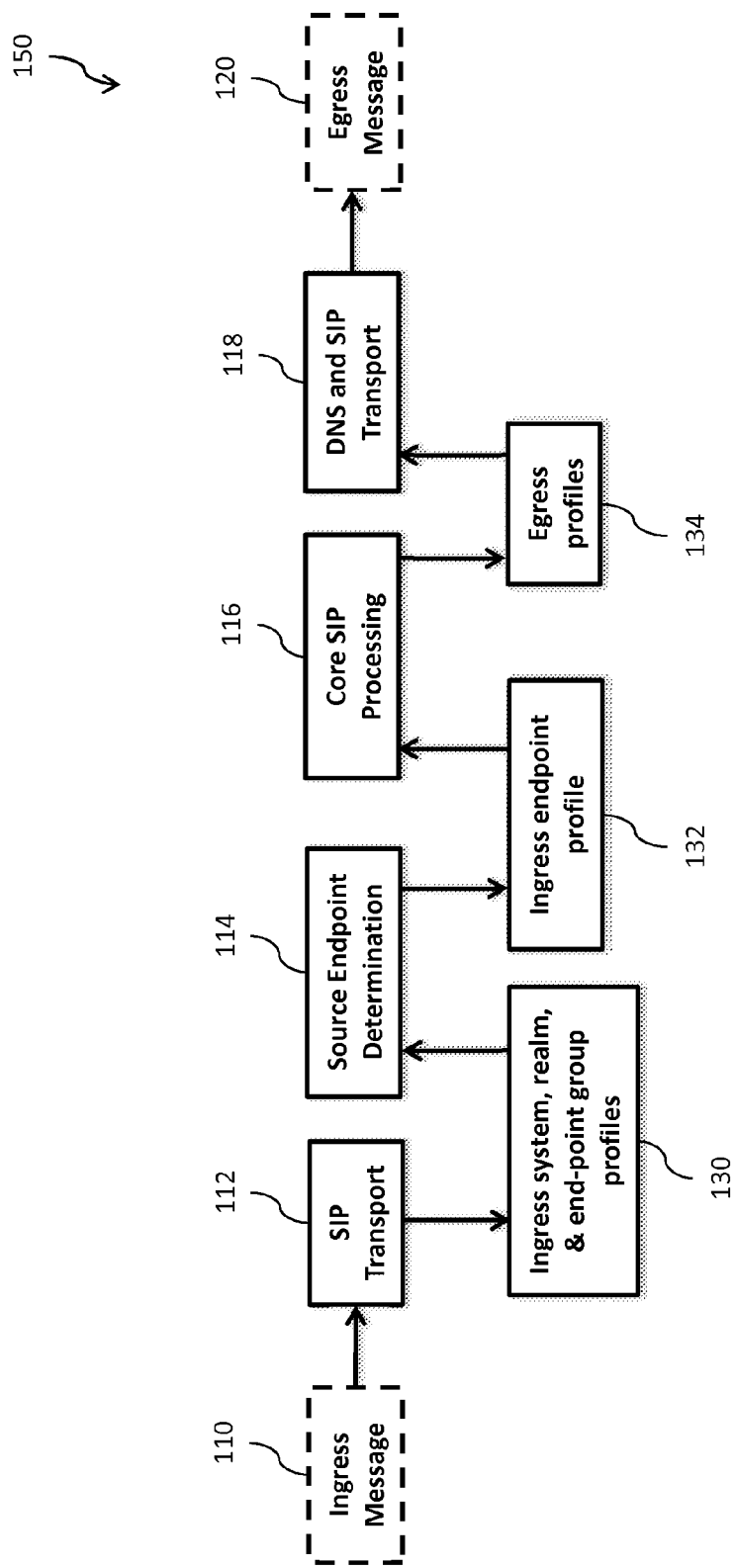
FIG. 1B illustrates an example of an SBC enhanced with functionality configured by a scripting language according to the embodiments described herein.

FIG. 1B illustrates an example SBC 150 enhanced with functionality configured by a scripting language according to the embodiments described herein. Similar to FIG. 1A, SBC 150 also includes ingress message 110, SIP transport 112, source endpoint determination 114, core SIP processing 116, and DNS and SIP transport 118. SBC 150 also includes a number of enhancements according to the embodiments described herein. For example, SBC 150 includes interception points at stages 130, 132, and 134 that each allow for processing of SIP messages in addition to the processing already performed by SBC 100. The processing of the SIP messages in stages 130, 132, and 134, however, can be customized based on profiles developed for each of stages 130, 132, and 134. For example, when an incoming SIP message such as ingress message 110 is processed by SBC 150, the processing can include modifying a portion of message 110 based on custom scripted rules that are included in a profile and associated with a processing scope.

The scope can be, for example, message 110 entering or exiting a system or realm level of the SBC as described by stage 130.

Further, modifying portions of an incoming message can also be performed before core processing of the SIP message. This allows for customization of the SIP message before it reaches the endpoint. Such customizations may include, for example, modifying the name, address, and/or number of a caller associated with the SIP message. Other modifications of the SIP message known in the art may be performed as well. Once a SIP message is processed, outgoing messages are sent in response to receiving the incoming message. SBC 150 may therefore also use rules to modify outgoing SIP messages such as, for example, egress message 120. Modifying of the outgoing message 120 can be performed, for example, after core processing of the incoming SIP message 110 is complete. In this way, customized rules can be used to process SIP messages more efficiently.

Profiles, Rules, Triggers, and Actions

Figure 2:
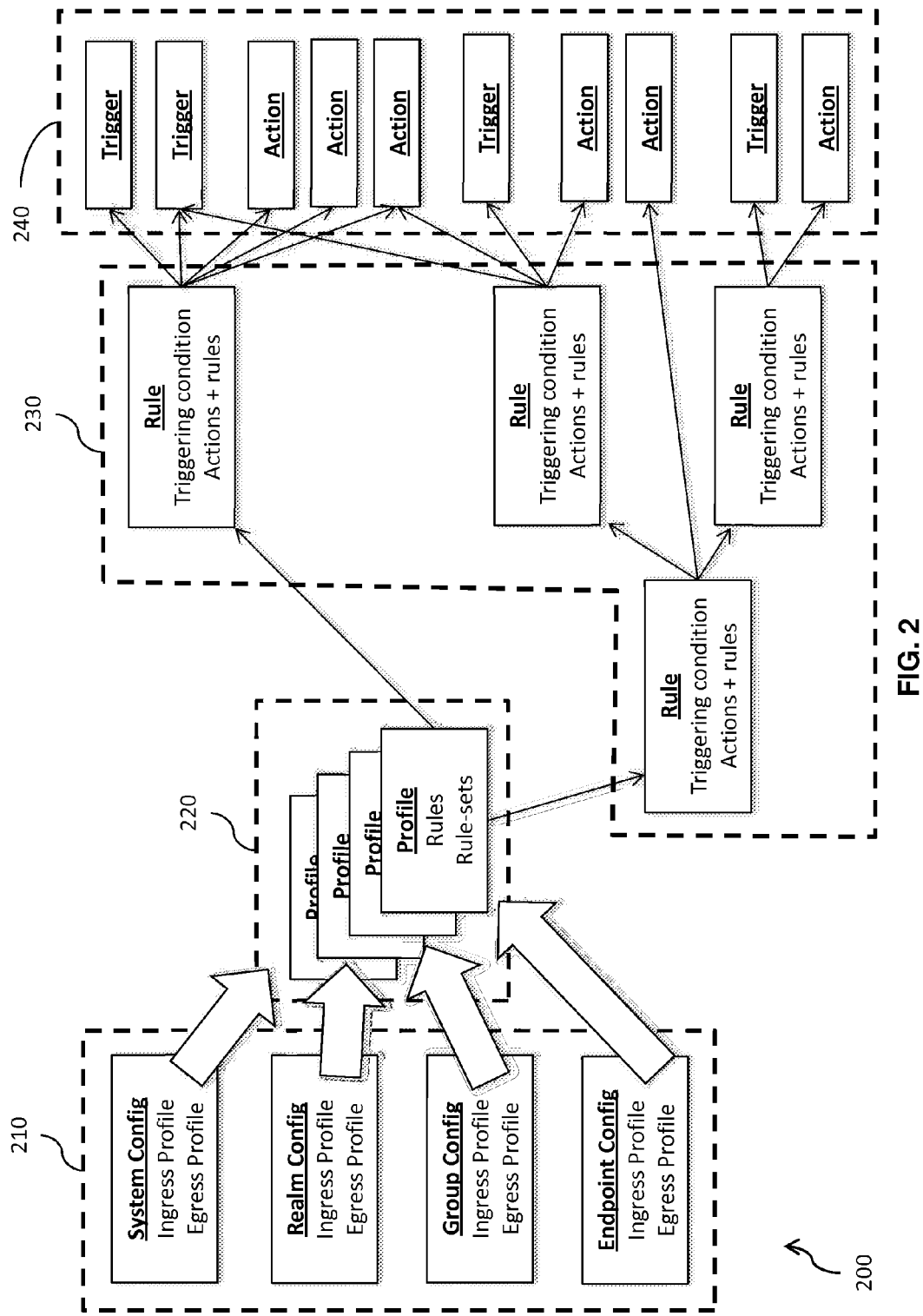
FIG. 2 illustrates an example of a collection of message modifications that can be performed using a scripting language according to the embodiments described herein.

FIG. 2 illustrates an example of a collection of message modifications 200 that can be performed using a scripting language according to the embodiments described herein such as, for example, SBC 150 in FIG. 1B. The message modifications 200 include a number of rules 230 organized into profiles 220. Each profile is associated with a processing scope 210 that determines the SBC processing stage 130, 132, 134 (FIG. 1B) where the rules associated with the profile are executed. For example, a profile may be associated with an endpoint ingress scope 132, meaning that the rules associate with the ingress scope will be executed immediately as messages ingress the endpoint.

Other processing stages, as described above in FIG. 1B, may include, for example, system ingress and egress, realm ingress and egress, endpoint group ingress and egress, and endpoint ingress and egress. Any number of rule groups can be configured and associated with any of these processing scopes. Further, the processing scopes defined herein are merely provided as an example and are not intended to limit the embodiments as other stages for processing messages by an SBC can be identified and utilized.

Each rule 230 may be included in one or more of the profiles 220. Each rule 230 may include actions and triggers that define both when the rule is executed and which operations are executed. An example of actions and triggers included in a rule 230 is represented in trigger/action list 240. Trigger/action list 240 includes a number of triggers and actions that are included in various rules 230.

The triggers included in list 240 have two primary purposes. First, triggers define the condition under which a particular set of manipulations or actions will be invoked. In other words, a trigger can be associated with one or more actions in a rule such that the actions are executed when a condition identified by the trigger is present within a given SIP message. Triggers can also be based on variables that store state data associated with a SIP message flow or a combination of both contexts and variables. Second, triggers provide contexts on which action may operate. Contexts are discussed below with reference to FIG. 3. Triggers may be further defined by a type that indicates the portion of SIP message data with which they interact. For example, types may be associated with SIP message portions such as SIP request-line or status-line attributes, SIP message headers, SIP message body headers, or Session Description Protocol (SDP) or ISDN User Part ("ISUP") payload data included in a SIP message.

The actions included in list 240 implement a variety of functions on SIP messages. For example, function that a particular action can perform may include inserting data into a SIP message, modifying data in a SIP message, deleting data from a SIP message, saving data from a SIP message to a variable associated with a memory location, dispatching SIP messages, or logging a SIP message to a log file. One or more actions can be associated with a particular rule and, as discussed above, any number of actions may be configured to execute upon meeting conditions of an associated trigger. Actions can be executed on contexts, as will be discussed below. Further, actions can be executed sequentially on a SIP message so any changes made by one action can affect a following trigger or action.

Contexts

Figure 3:
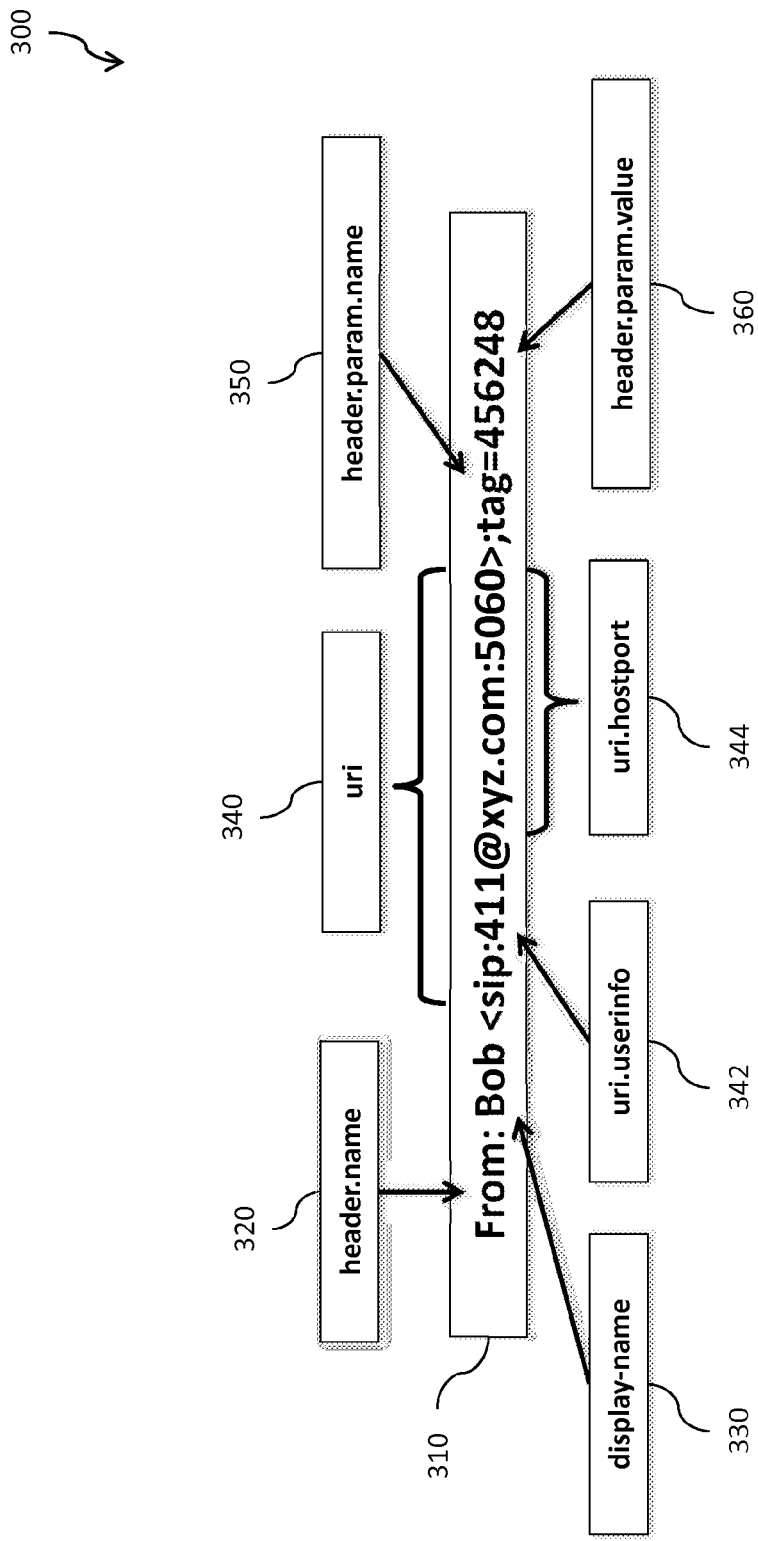
FIG. 3 illustrates an example of a context provided by a scripting language according to some of the embodiments.

FIG. 3 illustrates an example of a context 300 provided by a scripting language according to some embodiments. In general, contexts provide direct access to SIP message content or data without the need of specialized programming code to parse each individual message to locate the desired data to interact with. Contexts can be pre-defined by the scripting-type computer programming language included with and SBC. These pre-defined contexts may then be dynamically associated with portions of a SIP message using message overlays. The SIP message may also be parsed by the system automatically to reference specific data elements. Parsing may occur, for example, when a trigger is evaluated. Any contexts utilized by a trigger evaluation may then be available for use with associated actions.

Contexts 300 shows an example "From" element 310 of a SIP message. Any portion of a SIP message, however, may be used. Contexts 300 also include context references 320-360 that each provides direct access to a specific portion of a SIP message. For example, context 320 references the SIP message header name, context 330 references a user's display name included in the SIP message header field, context 340 references a universal resource identifier (URI) that indicates a user's network address, context 342 references the username portion of the URI of context 340, context 344 references the host and port of the URI of context 340, context 350 references a header parameter name, and context 360 references the header parameter value.

Each of contexts 320-360 may be used in evaluating a trigger or executing an action associated with a rule. For example, a rule may be configured to insert a header field such as, for example, a P-Asserted-Identity header into a SIP message if it is missing. To accomplish this modification, the trigger may be configured to check each incoming SIP message for the header by using a context that provides direct access to the header. If the context is not available or indicates the header is empty (i.e. has no data), the action associated with the trigger can be configured to insert the header and an associated value by using the context. Given the description provided above, a person of ordinary skill in the art will understand that contexts can be used in combination with a scripting language in a variety of ways to provide simplified access to portions of a SIP message without burdening a developer with an excessive amount of overhead.

Contexts 300 are offered as examples and may be equally applied to any portion or element of a SIP message and are not to be limited to the example offered in FIG. 3.

Variables

Figure 4:
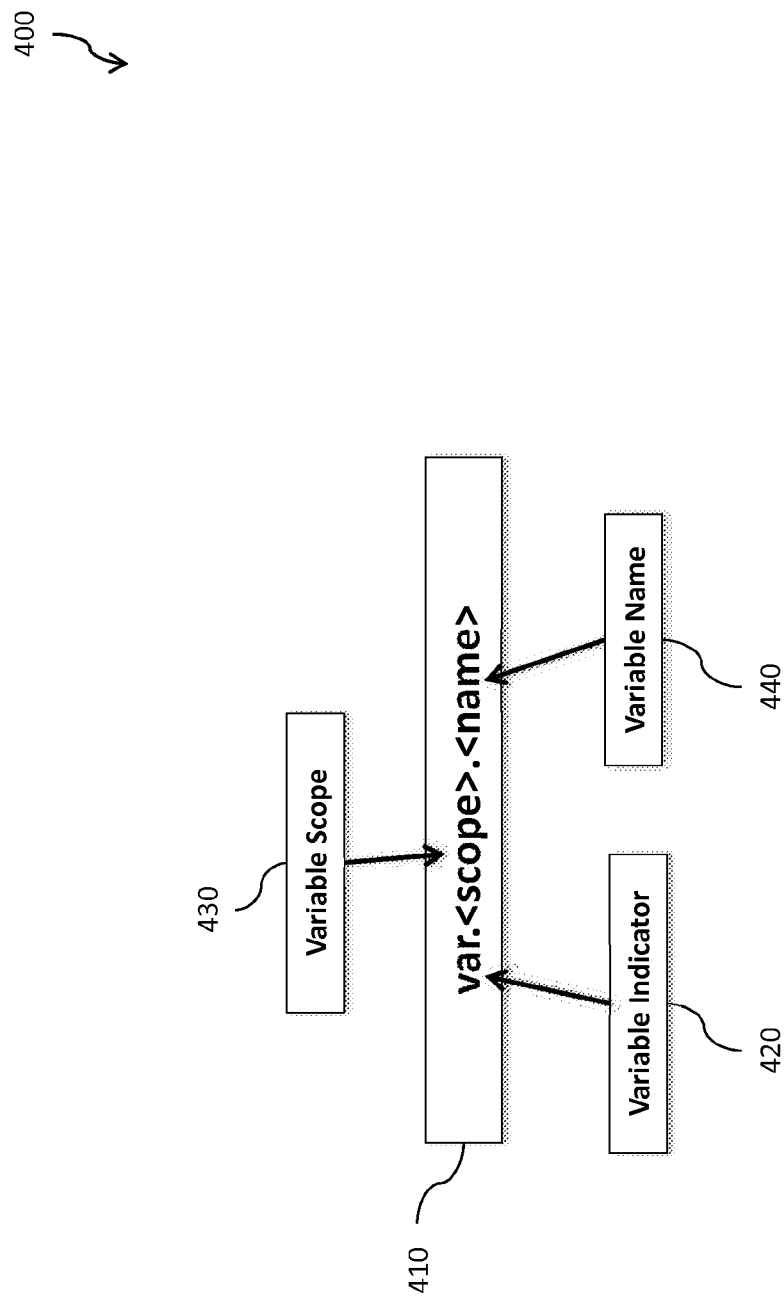
FIG. 4 illustrates an example of a variable provided by a scripting language according to some embodiments.

FIG. 4 illustrates an example of a variable 400 provided by a scripting language according to some embodiments. Variables according the embodiments are unique identifiers for references in memory locations of an SBC. Variables can be defined by a user through the scripting-type computer programming language and can be associated with a particular SIP message flow or SBC processing scope. The variables can be used to store data associated with a SIP message that can later be used to either act upon the SIP message or another message in the flow. Because data can be stored for the message flow, data from one SIP message can be used to modify or analyze data included in another SIP message within the flow. In this way, variables provide an expanded functionality for customizing processing of SIP messages. The variables can also be used to store numerical, string, or binary data such as, for example, counters, flags, generic text, pointers to memory, or other data not associated with a SIP message.

Variable 400 is shown using example syntax to better explain the features available for working with variables. Any syntax, however, may be used. Variable 400 includes variable reference 410, indicator 420, scope 430, and name 440. Indicator 420 is used by the system to identify whether an element is a variable or a context. In this example, the indicator "var" identifies variables from other elements. Scope 430 may be used to identify a rule profile or processing scope within the SBC that the variable is associated with. In other words, scope 430 may be identified as "system," "realm," etc. depending on the desired level of processing or may be custom defined based on a rules profile. Name 440 indicates the unique name of the variable within its associated scope and can be any name desired.

Variable 400 is offered as an example, and it is understood that various embodiments may include any appropriate variable.

Example Modified SIP Message

Figure 5:
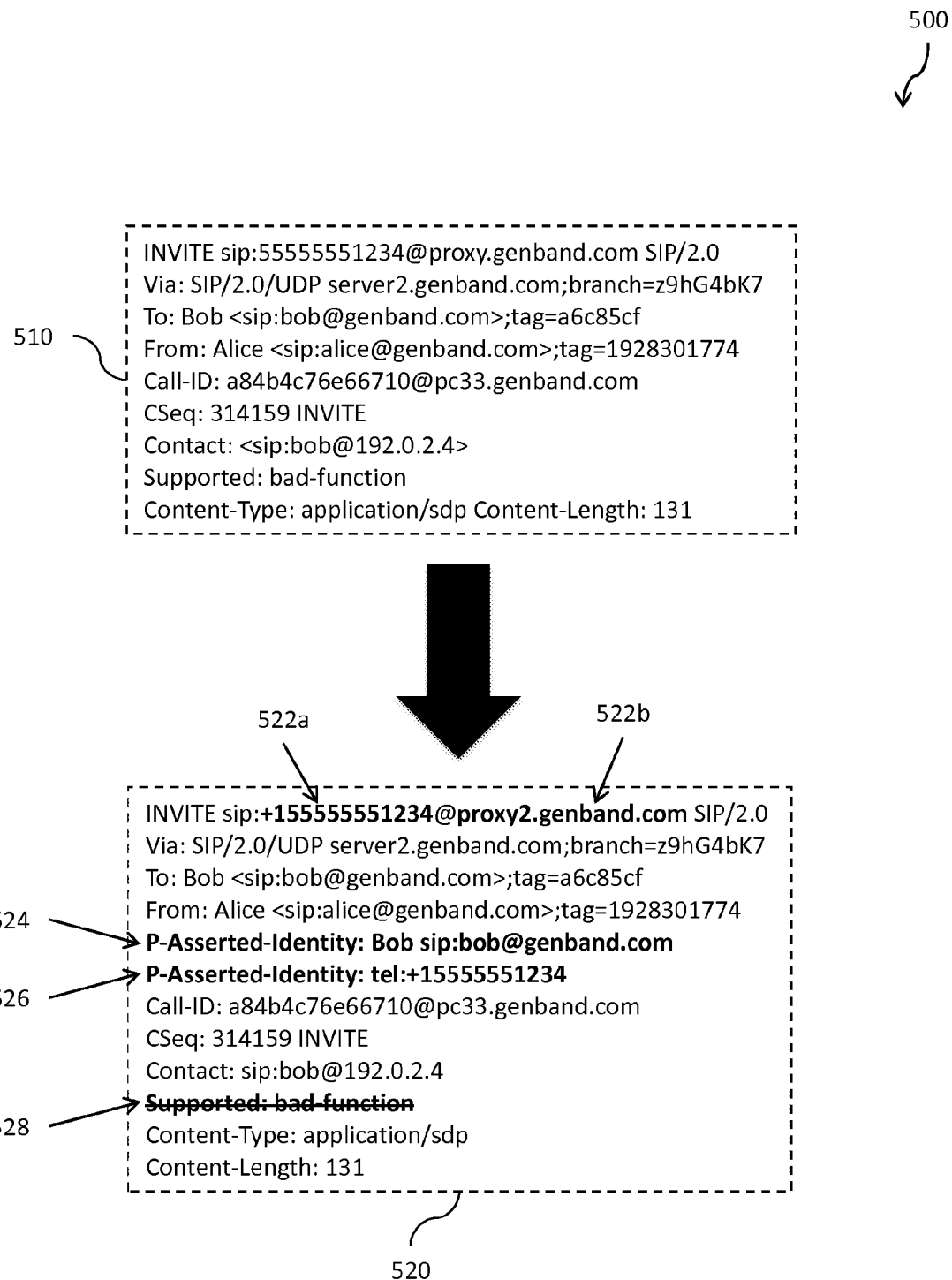
FIG. 5 illustrates an example SIP message that has been modified using a scripting language according to the embodiments descried herein.

FIG. 5 illustrates an example SIP message 500 that has been modified using a scripting language according to the embodiments descried herein. Modification 500 includes SIP message 510 that may be received from a user system, a service provider, or a telephone network. SIP message 510 may be processed by the SBC by applying one or more rules to modify the message. After applying a set of rules, SIP message 510 may be modified as shown in SIP message 520. Comparing message 510 to 520 shows that message 510 has been modified at 522a and 522b to include an updated username and host in the INVITE header. This allows the SBC to control message processing such as, for example, directing the message to a dynamic endpoint. Message 510 has also been modified at 524 and 526 to include P-Asserted-Identity fields to better identify the recipient of the message. Additionally, message 510 has been modified at 528 to remove a portion of the message that is not used by the SBC.

Modification 500 is offered as an example of the types of modification made possible with the embodiments described here and is not to be limiting.

Example System Embodiments

Figure 6:
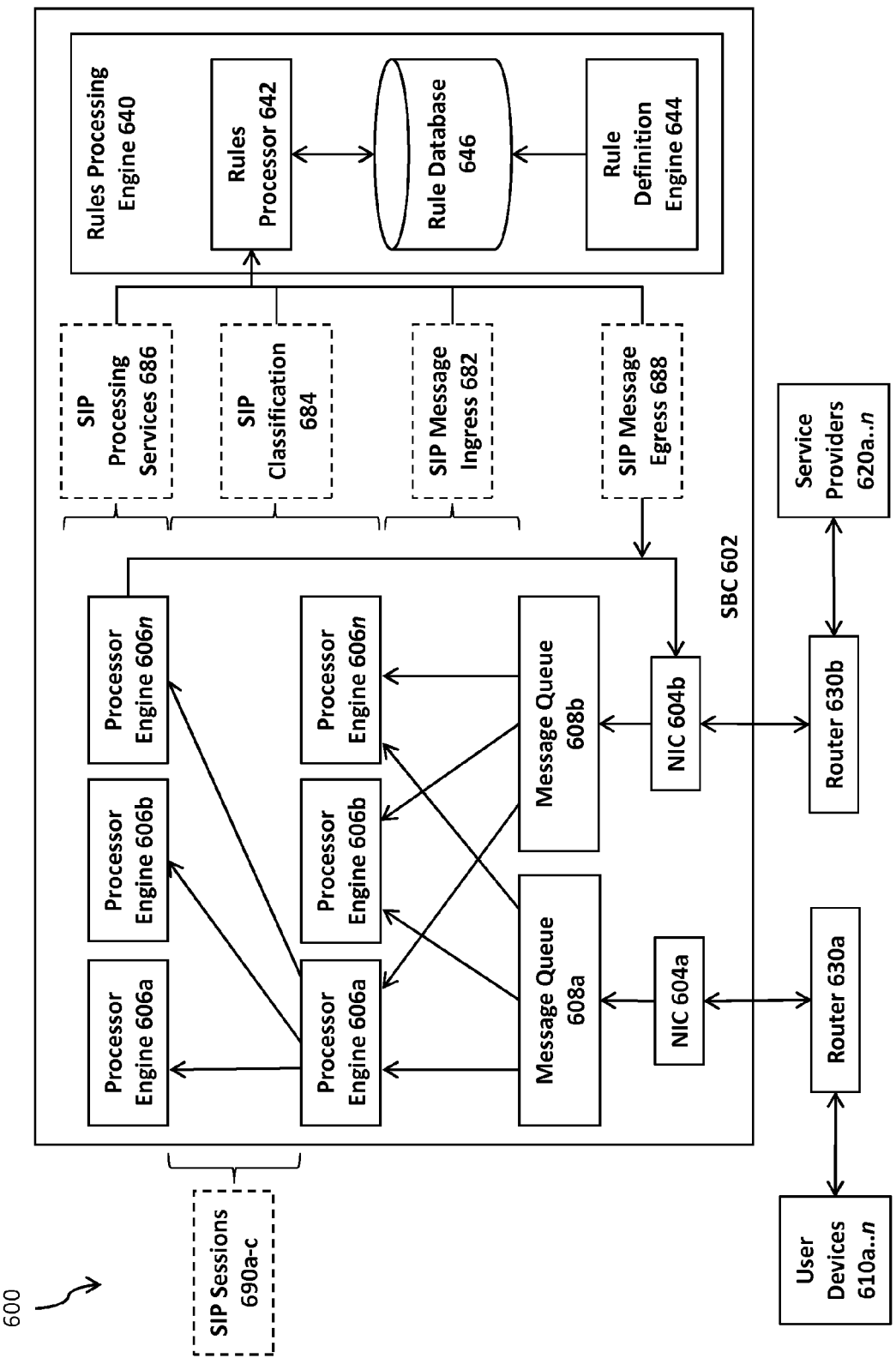
FIG. 6 illustrates an example of a system that is configured to implement the some of the embodiments described herein.

FIG. 6 illustrates an example of a system 600 that is configured to implement the embodiments described herein. System 600 includes session border controller (SBC) 602, routers 630a-b, user devices 610a-n that connect to SBC 602 through router 630a, and service providers 620a-n that connect to SBC 602 through router 630b. SBC 602 is a SIP server system that includes processor engines 606a-n to process data received by Network Interface Controllers (NICs) 604a-b. SBC 602 also includes receive queues 608a-b to receive SIP messages for processing. SBC 602 further includes rules processing engine 640 that includes rules processor 642, rules definition engine 644, and rules database 646.

SBC utilizes receive queues 608a-b to receive SIP messages for processing. In this example, SIP messages ingress during process 682 via message queues 608 for processing by the processors 606. The messages can then be classified based on a message flow or session such as, for example, sessions 690a-c during process 684 and may then be made available to a respective processor 606 for core processing during process 686. If SIP messages are to be transmitted in response to processing of messages in a flow, response SIP messages may egress via NICs 604 during process 688. The embodiments described herein may be accomplished by, for example, applying rules with their associated triggers and actions as described above during, for example, ingress or egress from any of the processes 682-688.

To process the rules, SBC 602 may utilize rules processor 642 included in rules processing engine 640. In some embodiments, rules processor 642 is configured to access rules database 646 that stores a collection of predefined rules. As described above, the rules in rules database 646 may be included in a profile that is associated one or more processing scopes that each described an execution stage for applying its respective rules. The rules may also include triggers that indicate conditions for executing associated actions. Further, the rules may also include or reference other rules included in the same profile.

Rules can be defined by a variety of sources such as, for example a scripting-type computer programming language. The scripting language can allow a user to define rules that modify SIP messages processed by the SBC. To define rules, rules processing engine 640 may include a user interface for creating, modifying, or deleting rules via the scripting language. The user interface may also include a debugging function that allows a developer to trace the application of rules as SIP messages are processed by the SBC. The user interface may further include an error recognition system that identifies error in rules and notifies the developer that errors exist. An execution log that tracks execution of the rules may also be provided in the user interface so the developer can see the results of executing the rules.

System 600 is provided as an example of an SBC system configured to carry out the embodiments described herein, and it is understood that the scope of embodiments may include any appropriate architecture for system 600.

Example Method Embodiments

Figure 7:
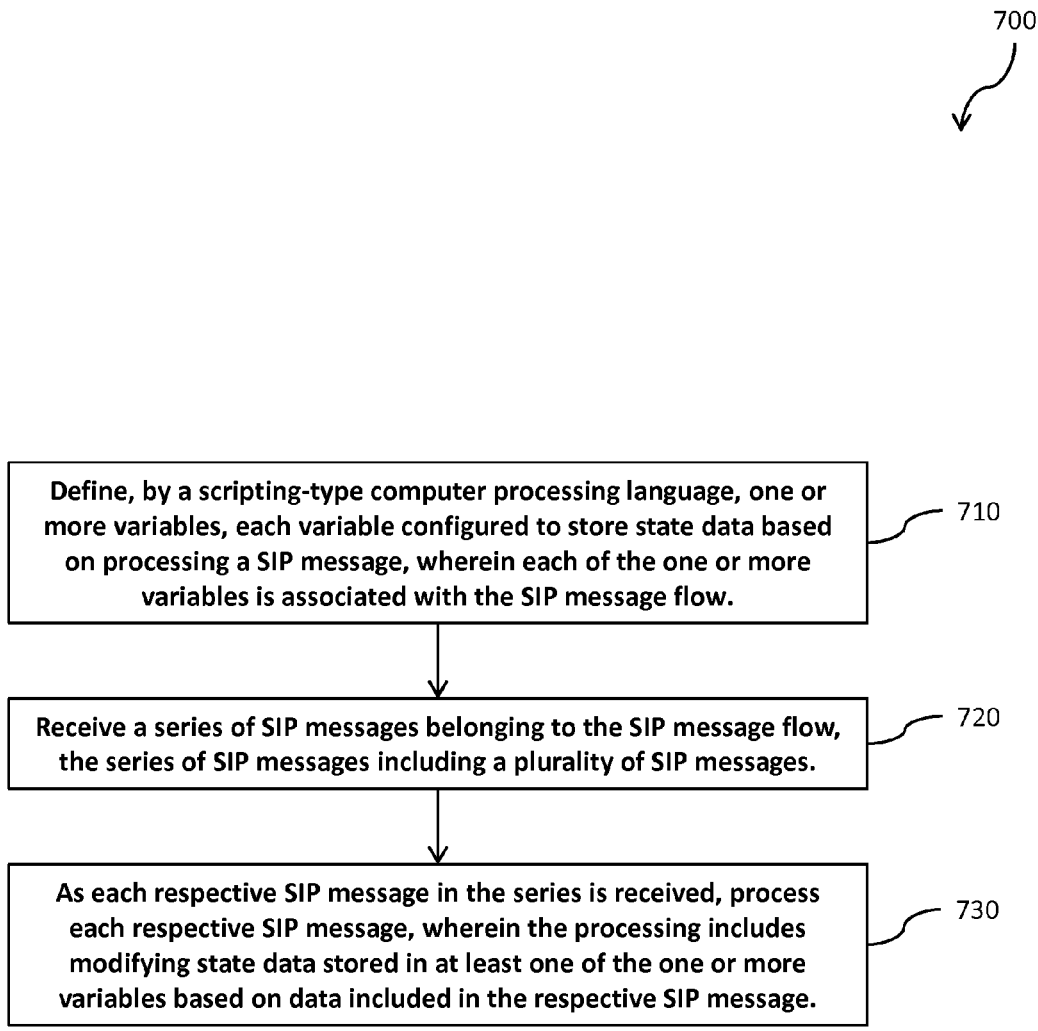
FIG. 7 illustrates an example method, adapted according to an embodiment.

FIG. 7 illustrates an example method 700, adapted according to one embodiment. Method 700 may be performed by a computing device that receives data from a network such as, for example, a server system, a client computing device, a switch, a VoIP server, or an SBC device. Method 700 is directed to processing SIP messages that are part of a SIP message flow. The SIP message flow may be part of, for example, a telephony session between two endpoint device such as a voice or video call over a packet-switched network.

In stage 710, one or more variables are defined by a scripting-type computer programming language. Each variable may be associated with a SIP message flow or a processing scope of an SBC executing rules associated with the variables. Each variable may be configured to store data based on processing a SIP message by the SBC. Each variable references a memory location for storing the data and provides persistent storage such that data from one SIP message in a flow can be stored and used in conjunction with processing subsequent SIP messages in the flow. The variables can be defined based on a profile that is associated with a processing scope that identifies a particular stage for processing SIP messages at the SBC. The variables may also each be defined using a name that uniquely identifies the variable within its respective profile, rule, or processing scope. Variables and variable scopes are discussed further above with reference to FIG. 4.

In stage 720, a series of SIP messages belonging to a SIP message flow are received. The series of SIP messages may be received by a specific process stage or component of the device processing the SIP message flow such as, for example, the processing stages described with reference to FIG. 1B. The SIP message flow may be received as part of a telephony session between an endpoint local to the SIP message processing and a remote endpoint. The endpoints may be, for example, IP telephone devices or a translation device for a public switched telephone network. Each SIP message in the series is processed in the order of reception which allows for the variables to maintain the state of the message flow.

In stage 730, each SIP message is processed as it is received. Processing a particular SIP message in the series includes modifying the data stored in at least one or more associated variables. Modifications of the data can be based on data included in the particular SIP message or data stored in the variables. The variables can also be modified based on the progress of the message flow, the number of messages of a given type that have been received, or any other characteristic related to the particular SIP message, the previously processes SIP messages, or the variables. In this way, the variables provide a method for storing information about SIP messages and the message flow such that subsequent SIP messages can be processed based on the stored information.

Figure 8:
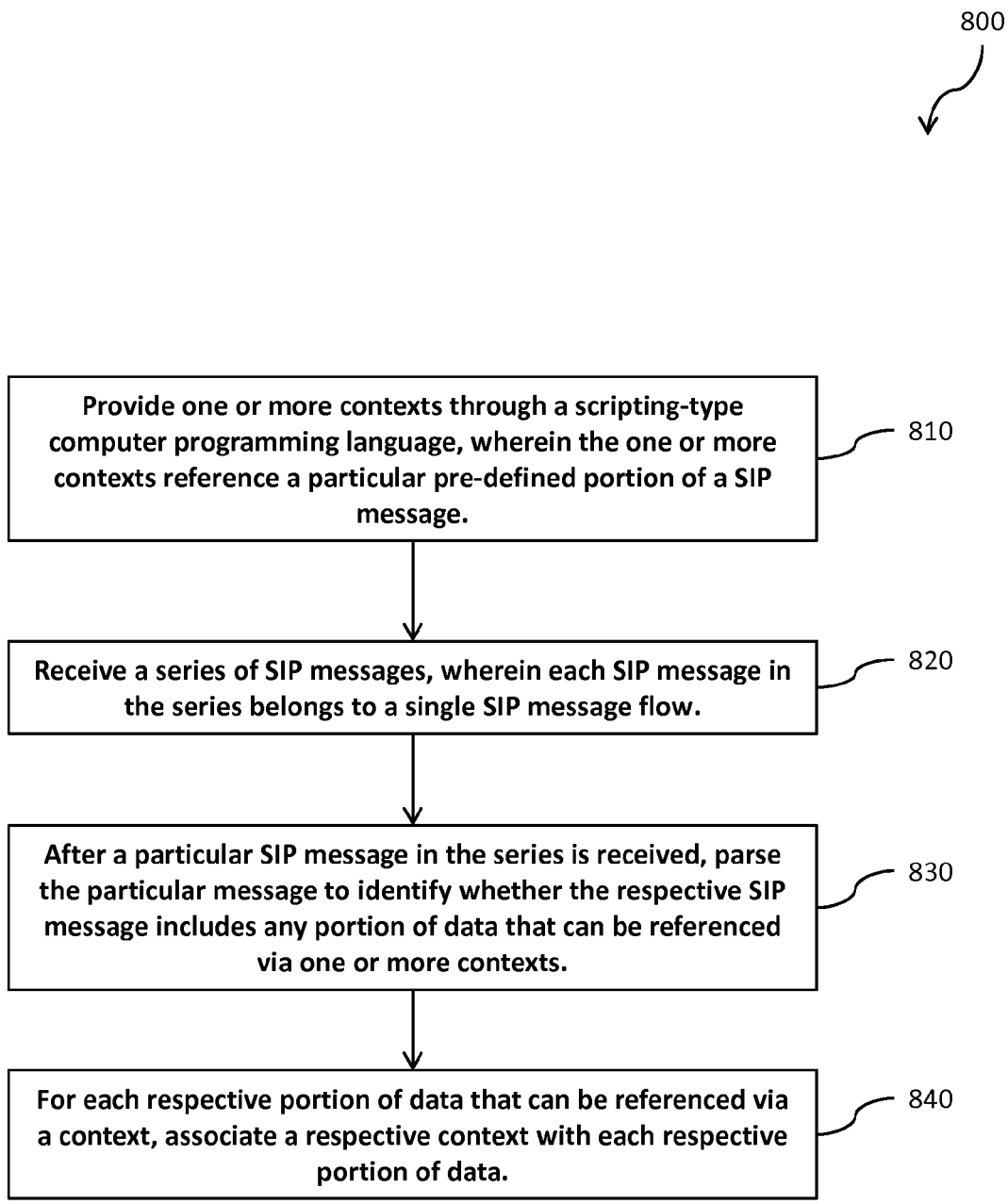
FIG. 8 illustrates an example method, adapted according to an embodiment.

FIG. 8 illustrates an example method 800, adapted according to one embodiment. Method 800 may be performed by a computing device that receives data from a network such as, for example, a server system, a client computing device, a switch, a VoIP server, or an SBC device.

Method 800 is directed to providing context through a scripting-type programming language to data included in a Session Initiation Protocol (SIP) message. As known to a person of ordinary skill in the art, a SIP message can include a variety of human readable text data and may be organized by headers and body. SIP messages may also include ISDN User Part (ISUP) data for interface with a public switched telephone network. The contexts provide direct access to data in a SIP message. Contexts are described in reference to FIG. 3.

In stage 810, one or more contexts are provided through a scripting-type computer programming language. As discussed above in reference to FIG. 3, the contexts reference a particular pre-defined portion of a SIP message and may be defined by a message overlay or similar method.

In stage 820, a series of SIP messages belonging to a SIP message flow are received. The series of SIP messages may be received by a specific process stage or component of the device processing the SIP message flow such as, for example, the processing stages described with reference to FIG. 1B. The SIP message flow may be received as part of a telephony session between an endpoint local to the SIP message processing and a remote endpoint. The endpoints may be, for example, IP telephone devices or a translation device for a public switched telephone network. Each SIP message in the series is processed in the order of reception which allows for the variables to maintain the state of the message flow.

In stage 830, after a particular SIP message in the series is received, the message is parsed in order to identify whether it includes any portion of data that can be referenced by one or more contexts. The contexts may essentially be pointers that reference the location in memory of the portion of data that it is to reference. A portion of a SIP message that may be referenced by a context may include, for example, elements of SIP message header, elements of the SIP message body, or data included with the SIP message such as, for example, ISUP data. Contexts may also include a sub-context that references a sub-portion of data referenced by a context. For example, a context may reference a URI included in a SIP message header and a sub-context may reference the username portion of the URI. In this case, syntax may be used to identify a context as a sub-context.

In stage 840, a context is associated with each portion of data in the SIP message that can be referenced. The association may be performed in combination with applying one or more rules, described above, to the SIP message. For example, if a particular rule that includes a trigger is applied to a SIP message, contexts for the SIP message may be associated when it is determined whether the conditions of the trigger are met. Associating contexts with data in a SIP message may also be performed at other stages of SIP message processing as would be beneficial to using contexts to process SIP messages.

Figure 9:
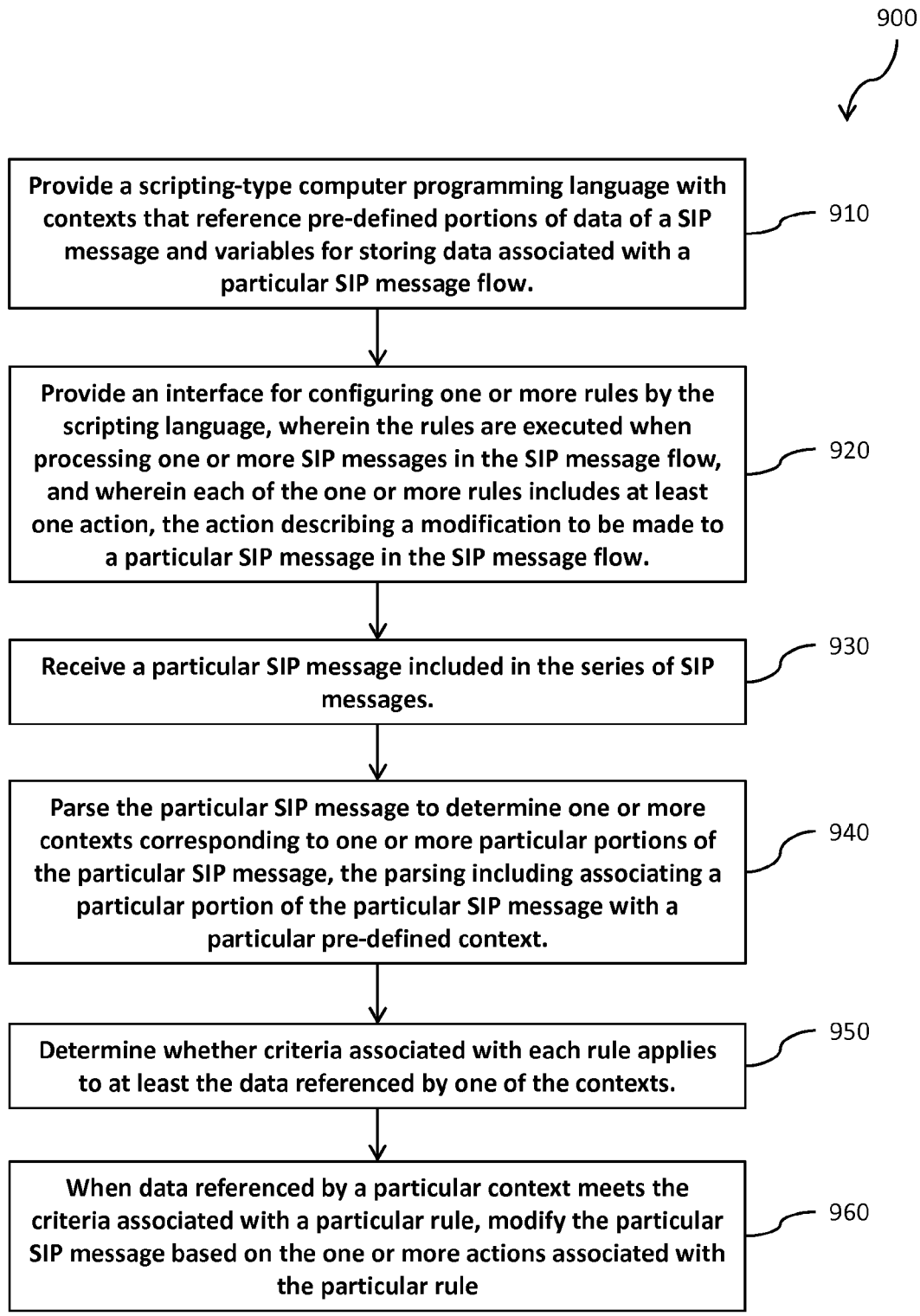
FIG. 9 illustrates an example method, adapted according to an embodiment.

FIG. 9 illustrates an example method 900, adapted according to one embodiment. Method 900 may be performed by a computing device that receives data from a network such as, for example, a server system, a client computing device, a switch, a VoIP server, or an SBC device.

Method 900 is directed to modifying a SIP message included in a series of SIP messages associated with a SIP message flow.

In stage 910, a scripting-type computer programming language is provided. The scripting language includes contexts that reference pre-defined portions of data of a SIP message and variables for storing data associated with a particular SIP message flow. Contexts are discussed above in reference to FIG. 3 and variables are discussed above in reference to FIG. 4.

In stage 920, one or more rules to be applied to a SIP message are configured to include at least an action. As described above with reference to FIG. 2, actions describe one or more modifications that can be made to a SIP message. Action may include, for example, inserting data into a SIP message, removing data from a SIP message, storing data of a SIP message, or logging a SIP message. Rules may also include triggers that describe conditions that must be met before an action can be applied. Triggers may include conditional statements, loops, or other commonly known programming actions. Like actions, triggers are also describe in more detail with reference to FIG. 2.

In stage 930, a particular SIP message included in the series of SIP messages is received. The series of SIP messages is associated with a SIP message flow and may be received by a specific process stage or component of the device processing the SIP message flow such as, for example, the processing stages described with reference to FIG. 1B. The SIP message flow may be received as part of a telephony session between an endpoint local to the SIP message processing and a remote endpoint. The endpoints may be, for example, IP telephone devices or a translation device for a public switched telephone network. Each SIP message in the series is processed in the order of reception which allows for the variables to maintain the state of the message flow.

In stage 940, the SIP message is parsed to determine at least a context of a portion of the particular SIP message. The contexts may essentially be pointers that reference the location in memory of the portion of data that it is to reference. A portion of a SIP message that may be referenced by a context may include, for example, elements of SIP message header, elements of the SIP message body, or data included with the SIP message such as, for example, ISUP data. Contexts may also include a sub-context that references a sub-portion of data referenced by a context. For example, a context may reference a URI included in a SIP message header and a sub-context may reference the username portion of the URI. In this case, syntax may be used to identify a context as a sub-context.

The parsing may include associating a context with each portion of SIP message data that can be referenced. The association may be performed in combination with applying one or more rules, described above, to the SIP message. For example, if a particular rule that includes a trigger is applied to a SIP message, contexts for the SIP message may be associated when it is determined whether the conditions of the trigger are met. Associating contexts with data in a SIP message may also be performed at other stages of SIP message processing as would be beneficial to using contexts to process SIP messages.

In stage 950, it is determined whether a trigger, criterion, or condition associated with each rule applies to the data associated with one of the contexts. The trigger may be, for example, a conditional statement or simply a requirement that a context is available for a SIP message. Triggers are discussed in more detail in reference to FIG. 2.

In stage 960, when the trigger, criterion, or condition associated with a rule is met, the SIP message is modified based on the one or more associated actions. The associated actions may also include rules that include other triggers and actions. In this way, rules can be nested within other rules. This allows for efficient reuse of rules within the system. Actions and their results are described in more detail in reference to FIGS. 2 and 5.

Various embodiments may add, omit, rearrange, or modify the stages of any of methods 700, 800, or 900 according to the embodiments described herein.

Various embodiments may provide one or more advantages over conventional systems. For example, each of the embodiments provides a scripting language that allows end user to configure SBCs based on end-user specifications. In other words, instead of relying only on functionality programmed into the SBC by a manufacturer, an end user can configure an SBC to process SIP messages based on custom criterion. The scripting language includes contexts that allow end users to efficiently access specific portions of a SIP message through the scripting language without the need of complicated logical expressions. Additionally, the scripting language includes variables that allow an end user to write rules that modify SIP messages based on data stored from previous SIP message processing.

When implemented via computer-executable instructions, various features of embodiments of the present disclosure are in essence the software code defining the operations of such various features. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

Example Computer System

Figure 10:
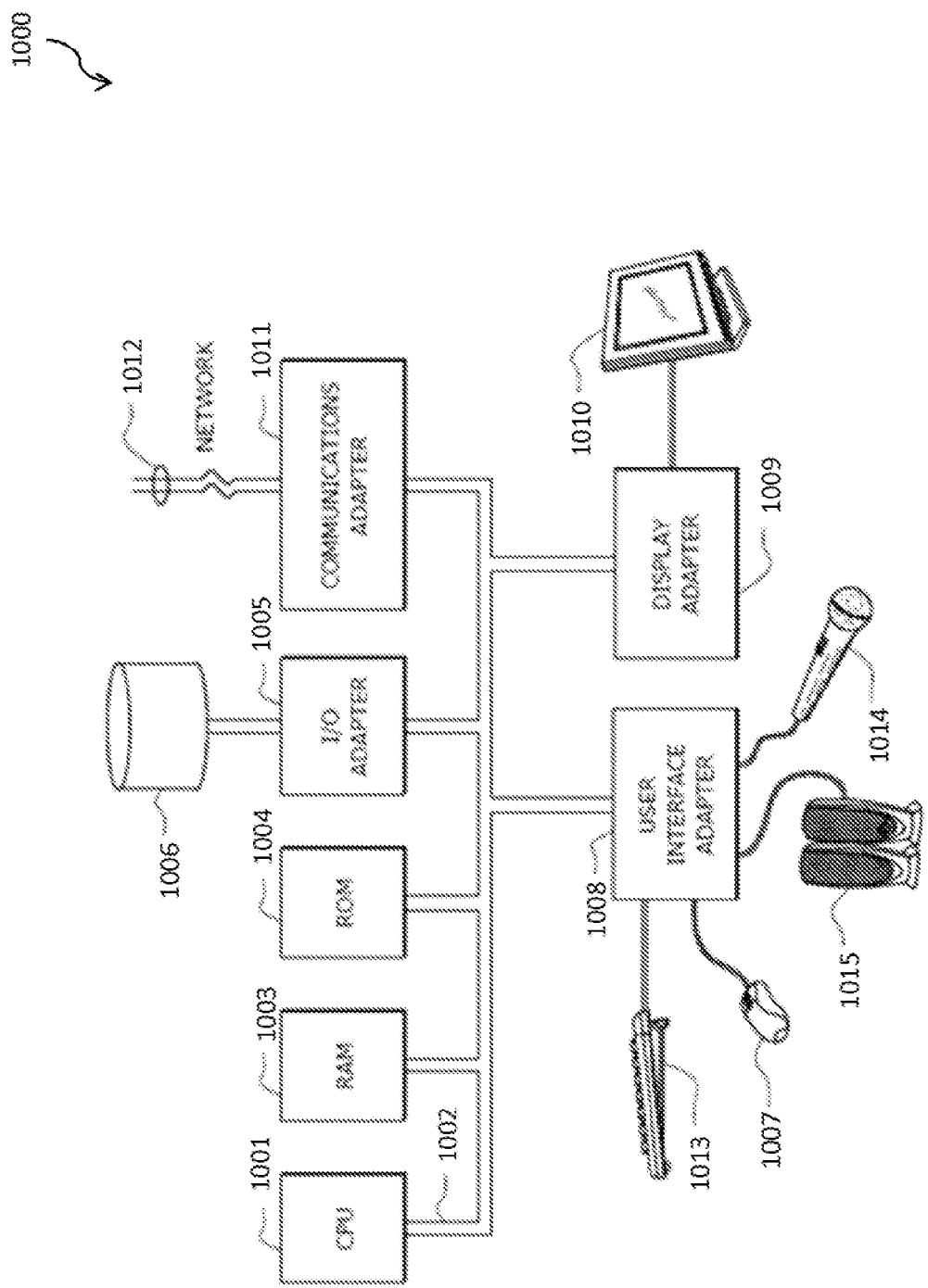
FIG. 10 illustrates an example computer system adapted according to an embodiment of the present disclosure.

FIG. 10 illustrates an example computer system 1000 adapted according to one embodiment of the present disclosure. That is, computer system 1000 comprises an example system on which embodiments of the present disclosure may be implemented (such as a computer acting as a network node and either producing or consuming a data stream). In another example, processor engines 606a-n and rules processing engine 640 may be represented by different cores in a processor or even by different processors that are similar to CPU 1001. In various embodiments, the computer-readable instructions may be tangibly written as hardware or as firmware. Thus, while some embodiments may include a computer similar to computer system 1000 performing operations of FIG. 6, other embodiments may include actions of FIG. 6 performed at the level of abstraction of a CPU or the cores within a multi-core CPU.

Central processing unit (CPU) 1001 is coupled to system bus 1002. CPU 1001 may be any general purpose or specialized purpose CPU. However, the present disclosure is not restricted by the architecture of CPU 1001 as long as CPU 1001 supports the inventive operations as described herein. CPU 1001 may execute the various logical instructions according to embodiments of the present disclosure. For example, one or more CPUs, such as CPU 1001, or one or more cores, may execute machine-level instructions according to the exemplary operational flows described above in conjunction with FIG. 7-9.

Computer system 1000 also preferably includes random access memory (RAM) 1003, which may be SRAM, DRAM, SDRAM, or the like. Computer system 1000 preferably includes read-only memory (ROM) 1004 which may be PROM, EPROM, EEPROM, or the like. RAM 1003 and ROM 1004 hold system data and programs.

Computer system 1000 also preferably includes input/output (I/O) adapter 1005, communications adapter 1011, user interface adapter 1008, and display adapter 1009. I/O adapter 1005, user interface adapter 1008, and/or communications adapter 1011 may, in certain embodiments, enable an administrator to interact with computer system 1000 in order to input information to install new applications and keep the system running.

I/O adapter 1005 preferably connects to storage device(s) 1006, such as one or more of hard drive, compact disc (CD) drive, solid state drive, etc. to computer system 1000. The storage devices may be utilized when system memory RAM 1003 is insufficient for the memory requirements associated with storing data. Communications adapter 1011 is preferably adapted to couple computer system 1000 to communication link 1012 (e.g., the Internet, a LAN, a cellular network, etc.). User interface adapter 1008 couples user input devices, such as keyboard 1013, pointing device 1007, and microphone 1014 and/or output devices, such as speaker(s) 1015 to computer system 1000. Display adapter 1009 is driven by CPU 1001 to control the display on display device 1010 to, for example, when interacting with an administrator.

In accordance with embodiments of the present disclosure, computer system 1000 performs specific operations by CPU 1001 executing one or more sequences of one or more instructions contained in system memory component 1003. Such instructions may be read into system memory component 1003 from another computer readable medium, such as ROM 1004 or drive 1006. In other embodiments, hard-wired circuitry may be used in place of (or in combination with) software instructions to implement the present disclosure.

Logic may be encoded in a computer readable, non-transitory medium. Such a medium may take many forms, including but not limited to, non-volatile media and volatile media. In various implementations, non-volatile media includes optical or magnetic disks, such as disk or solid-state drive component 1006, and volatile media includes dynamic memory, such as system memory component 1003. CPU 1001 reads application code from the readable medium and executes the code to provide the described functionality.

CONCLUSION

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method for providing context through a scripting-type programming language to data included in a Session Initiation Protocol (SIP) message comprising:
    providing one or more contexts through a scripting-type computer programming language, wherein each of the one or more contexts functions as a pointer to a particular pre-defined portion of a SIP message, wherein each context is a pointer that references the memory location of the respective portion of data that it is associated with;
    providing one or more rules of an ingress profile and one or more rules of an egress profile, wherein the one or more rules of the ingress profile are different than the one or more rules of the egress profile, and wherein each of the one or more rules includes at least one trigger and at least one action;
    receiving, by at least one processor, a series of SIP messages, wherein each SIP message in the series belongs to a same SIP message flow;
    after a particular SIP message in the series is received, parsing the particular message to identify whether the particular SIP message includes any portion of data that can be referenced via the one or more contexts;
    determining whether the at least one action of any of the one or more rules of the ingress profile or the one or more rules of the egress profile is triggered by the SIP message;
    for each respective portion of data that can be referenced via a context, associating a respective context with each respective portion of data such that the respective portion of data can be referenced by the context; and
    using the one or more contexts, applying, to the series of SIP messages, the one or more rules of the ingress profile or the one or more rules of the egress profile for which the at least one action is triggered.

2. The computer-implemented method of claim 1, wherein a particular context includes a sub-context that is associated with a particular sub-portion of the respective portion of data.

3. The computer-implemented method of claim 1, further comprising:
    defining one or more variables, where each variable includes state data of the SIP message flow; and
    modifying the one or more variables based on a particular context.

4. The computer-implemented method of claim 3, wherein modifying the one or more variables includes storing data associated with a particular context at a memory location referenced by a particular variable.

5. The computer-implemented method of claim 1, wherein a particular context is associated with a header field of a particular SIP message.

6. The computer-implemented method of claim 1, further comprising:
    defining one or more variables, where each variable includes state data of the SIP message flow; and
    modifying the portion of data associated with a particular context based on state data stored at a particular variable.

7. The computer-implemented method of claim 6, wherein modifying the portion of data includes modifying a portion of a header field of a SIP message to include state data stored in a particular variable.

8. The computer-implemented method of claim 1, wherein parsing the particular message includes applying a message overlay to the particular message to determine the one or more contexts for the particular message.

9. A computer system for providing context through a scripting-type programming language to data included in a Session Initiation Protocol (SIP) message comprising:
    a processor; and
    a memory comprising machine readable instructions that when executed by the processor, cause the system to
    provide one or more contexts through a scripting-type computer programming language, wherein each of the one or more contexts functions as a pointer to a particular pre-defined portion of a SIP message, wherein each context is a pointer that references the memory location of the respective portion of data that it is associated with;
    provide one or more rules of an ingress profile and one or more rules of an egress profile, wherein the one or more rules of the ingress profile are different than the one or more rules of the egress profile, and wherein each of the one or more rules includes at least one trigger and at least one action;
    receive a series of SIP messages, wherein each SIP message in the series belongs to a same SIP message flow;
    after a particular SIP message in the series is received, parse the particular message to identify whether the particular message includes any portion of data that can be referenced via one or more contexts;
    for each respective portion of data that can be referenced via a context, associate a respective context with each respective portion of data such that the respective portion of data can be referenced by the context;
    determine whether the at least one action of any of the one or more rules of the ingress profile or the one or more rules of the egress profile is triggered by the SIP message; and
    using the one or more contexts, apply, to the series of SIP messages, the one or more rules of the ingress profile or the one or more rules of the egress profile for which the at least one action is triggered.

10. The computer system of claim 9, wherein a particular context includes a sub-context that is associated with a particular sub-portion of the respective portion of data.

11. The computer system of claim 9, wherein the machine readable instructions when executed by the processor further cause the system to:

define one or more variables, where each variable is configured to store state data based on the SIP message flow; and
modify the one or more variables based on accessing data referenced by a particular context.

12. The computer system of claim 11, wherein the machine readable instructions when executed by the processor further cause the system to store data associated with a particular context at a memory location referenced by a particular variable.

13. The computer system of claim 9, wherein a particular context is associated with a header field of a particular SIP message.

14. The computer system of claim 9, wherein the machine readable instructions when executed by the processor further cause the system to:
define one or more variables that are each configured to store state data of the SIP message flow; and
modify the portion of data in a SIP message associated with a particular context based on state data stored at a particular variable.

15. The computer system of claim 9, wherein the machine readable instructions when executed by the processor further cause the system to modify a portion of a header field of a SIP message to include state data stored in a particular variable.

16. The computer system of claim 9, wherein the machine readable instructions when executed by the processor further cause the system to apply a message overlay to the particular message to determine the one or more contexts for the particular message.

17. A session border controller that provides context to data in a Session Initiation Protocol (SIP) message through a scripting-type programming language comprising:
a processor; and
a memory comprising machine readable instructions that when executed by the processor, cause the system to:
provide one or more pre-defined contexts by a scripting-type computer programming language, wherein the contexts are each configured to allow a rule to use a pointer to a particular portion of a SIP message, wherein each context is a pointer that references the memory location of the respective portion of data that it is associated with;
provide one or more rules of an ingress profile and one or more rules of an egress profile, wherein the one or more rules of the ingress profile are different than the one or more rules of the egress profile, and wherein each of the one or more rules includes at least one trigger and at least one action;
receive a SIP message flow, wherein the SIP message flow includes one or more SIP messages that are received in series;
parse each SIP message as it is received in order to identify whether a particular SIP message activates a trigger included in a particular rule;
for each SIP message that triggers the particular rule of either the ingress profile or the egress profile, apply a context overlay to the SIP message such that each context included in the particular rule references its associated portion of the SIP message;
and using the one or more contexts, apply, to each SIP message, the one or more rules of the ingress profile or the one or more rules of the egress profile for which the at least one action is triggered.

18. The session border controller of claim 17, wherein the machine readable instructions when executed by the processor further cause the system to provide a user interface configured to receive rules entered by a user, the rules including triggers and actions to be applied to SIP messages and contexts for referencing particular portions of the SIP messages.

* * * * *